United States Patent [19]

Hangleiter

[11] Patent Number: 5,489,167
[45] Date of Patent: Feb. 6, 1996

[54] CHUCK ACTUATOR WITH WEDGE-TYPE LOCKING

[75] Inventor: Eugen Hangleiter, Hermaringen, Germany

[73] Assignee: Gunter Horst Rohm, Sontheim, Germany

[21] Appl. No.: 297,608

[22] Filed: Aug. 29, 1994

[30] Foreign Application Priority Data

Sep. 10, 1993 [DE] Germany .................. 43 30 679.9

[51] Int. Cl.⁶ .................. B23C 5/26; B23B 31/10
[52] U.S. Cl. .................. 409/233; 279/125
[58] Field of Search .................. 409/231, 233; 279/125, 140

[56] References Cited

U.S. PATENT DOCUMENTS

| | | | |
|---|---|---|---|
| 4,411,568 | 10/1983 | Rohm | 409/233 |
| 5,018,916 | 5/1991 | Bauch et al. | 409/233 |
| 5,052,866 | 10/1991 | Bauch et al. | 409/233 |

FOREIGN PATENT DOCUMENTS

| | | | |
|---|---|---|---|
| 3726305 | 2/1989 | Germany | 409/233 |
| 32508 | 2/1991 | Japan | 409/233 |
| 509354 | 4/1976 | U.S.S.R. | 409/233 |
| 532488 | 1/1977 | U.S.S.R. | 409/233 |

OTHER PUBLICATIONS

Werkstatt und Betrieb, (Carl Hanser Verlag 1991; pp. 251–254), W. Otto & B. Panzert; "Konstruktion Eines Werkzeug–Spannzeugs".

*Primary Examiner*—Daniel W. Howell
*Attorney, Agent, or Firm*—Herbert Dubno; Andrew Wilford

[57] ABSTRACT

A holder for a tool or workpiece has a tubular working spindle centered on and rotatable about an axis, an elongated pulling element axially displaceable in the spindle and having a front end provided with holder jaws and a rear end with a forwardly directed face perpendicular to the axis. An actuating body axially displaceable in the spindle forward of the element face has an outwardly directed and rearwardly inwardly inclined face. A spring between the spindle and the body urges the body continuously backward. At least one wedge in the spindle between the body and the element face has a rear end face flatly abuttable with the element face, an inclined inner face flatly abuttable with the body face, and a forwardly outwardly inclined front end face. This wedge is movable between an outer position with its end faces respectively flatly abutting the element and body faces and an inner position with its rear end face flatly abutting the element face and its front end face inward of and out of contact with the body face. A support sleeve fixed in the spindle forward of the element face has a rearwardly directed and rearwardly outwardly inclined face flatly abuttable with the front face of the wedge.

8 Claims, 5 Drawing Sheets

CHUCK ACTUATOR WITH WEDGE-TYPE LOCKING

FIELD OF THE INVENTION

The present invention relates to an actuator for a machine tool. More particularly this invention relates to an actuator for a tool or workpiece holder for a lathe or other rotary machining equipment.

BACKGROUND OF THE INVENTION

A standard workpiece or tool holder for a lathe or like turning machine has as described in the German publication *Werkstatt und Betrieb* (Carl Hanser Verlag 1991; pages 251–254) a tubular working spindle centered on and rotatable about an axis and an elongated pulling element axially displaceable in the spindle and having a front end provided with at least one holder jaw and a rear end with a forwardly directed face substantially perpendicular to the axis. An actuating body axially displaceable on the pulling element in the spindle forward of the element face has an outwardly directed face and rearwardly inwardly inclined face. A spring braced between the spindle and the body urges the body continuously backward toward the element face. A plurality of wedges in the spindle between the body and the element face each have a rear face flatly abuttable with the element face, an inclined inner face flatly abuttable with the body face, and a forwardly outwardly inclined front face. A support sleeve fixed in the spindle forward of the element face has a face flatly abuttable with the front face of the wedges. Such a holder is particularly usable with steep-angle tools.

When the holder device is in the locked/holding position the pulling element is not only pulled back in the spindle by the springs, which are braced via the actuating body and wedges on the element face, but the wedges also bear forward on the fixed support sleeve and thereby lock the element in the spindle against any significant movement. Thus even if a forward traction that exceeded the spring force were exerted on the element, the element would not move forward into the unlocked/releasing position.

Such a holder is unlocked by back the actuating body against the force of the spring by means of an unlocking pin that is powered normally hydraulically. This allows the wedges to be pushed back into recesses in the actuating body so that they allow this body to move forward, in turn allowing the spindle to move forward. These recesses in the actuating body not only weaken it, but add to the radial dimension of the assembly disadvantageously.

OBJECTS OF THE INVENTION

It is therefore an object of the present invention to provide an improved workpiece or tool holder for rotary machining equipment.

Another object is the provision of such a holder which is simpler, stronger, and smaller than the prior-art such holders.

SUMMARY OF THE INVENTION

These objects are achieved according to this invention in a holder for a tool or workpiece to be rotated about an axis which has a tubular working spindle centered on and rotatable about the axis, an elongated pulling element axially displaceable in the spindle and having a front end provided with at least one holder jaw and a rear end with a forwardly directed face substantially perpendicular to the axis, and an actuating body axially displaceable on the pulling element in the spindle forward of the element face and having an outwardly directed and rearwardly inwardly inclined face. A spring braced between the spindle and the body urges the body continuously backward toward the element face. At least one wedge in the spindle between the body and the element face has a rear end face flatly abuttable with the element face, an inclined inner face flatly abuttable with the body face, and a forwardly outwardly inclined front end face. According to the invention this wedge is movable between an outer position with its end faces respectively flatly abutting the element and body faces and an inner position with its rear end face flatly abutting the element face and its front end face inward of and out of contact with the body face. A support sleeve fixed in the spindle forward of the element face has a rearwardly directed and rearwardly outwardly inclined face flatly abuttable with the front face of the wedge. An actuator is provided for pushing the body axially forward relative to the element and thereby moving the wedge into its inner position and for thereafter pushing the element forward with the wedge moving axially forward within the support sleeve.

Thus with this system the wedges are entrained with the actuating body when the holder is unlocked or released. These wedges move inside the support sleeve so that no recesses need be provided for them in the actuating body making it possible to reduce the radial size of the holder. The resultant assembly is quite slim while being as strong as the fatter prior-art systems. Since such a holder is rotated at high speed, it is very desirable to reduce its radial dimension to reduce throw and other centrifugally caused problems.

According to a feature of this invention the body face and the inner wedge face are formed with an interfitting groove/ridge formation, preferably of dovetail section. Furthermore the support sleeve is formed with a rearwardly open notch having a floor forming the respective rear face and a pair of sides extending parallel to the axis and engaging complementary sides of the wedge. For self-locking action the body face forms with the sleeve face a small acute angle Normally there are a plurality of such wedges angularly equispaced about the axis and the body is tubular and slidable on the element. The pulling element itself is formed by a rod extending forward on the axis and having a front end carrying the jaw and a rear end fixed in a disk forming the element face. A piston in the spindle axially behind the disk forms with the spindle a pressurizable chamber and at least one axially extending rod axially slidable in the disk has a front end engageable with the body and a rear end engageable with the piston. The chamber can be pressurized to push the body axially forward so the wedges can move into the inner positions.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
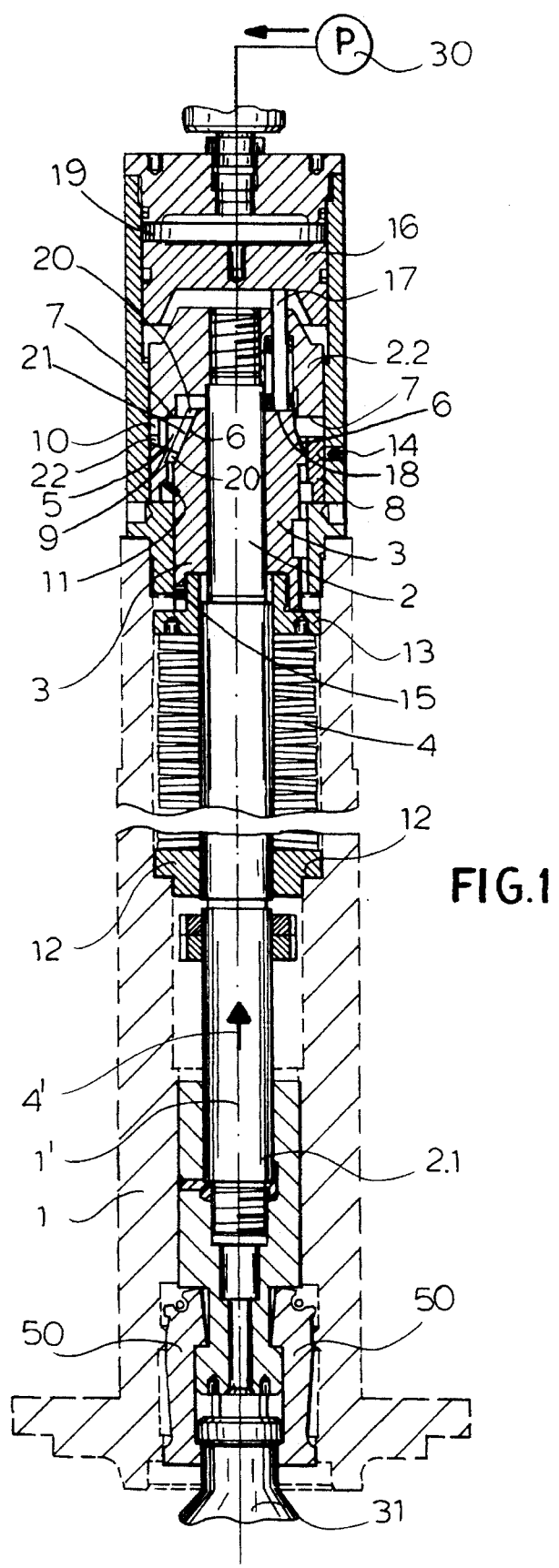
FIGS. 1 and 2 are axial sections through the tool holder of this invention in the locked/holding and unlocked/releasing positions, respectively.
Figure 2:
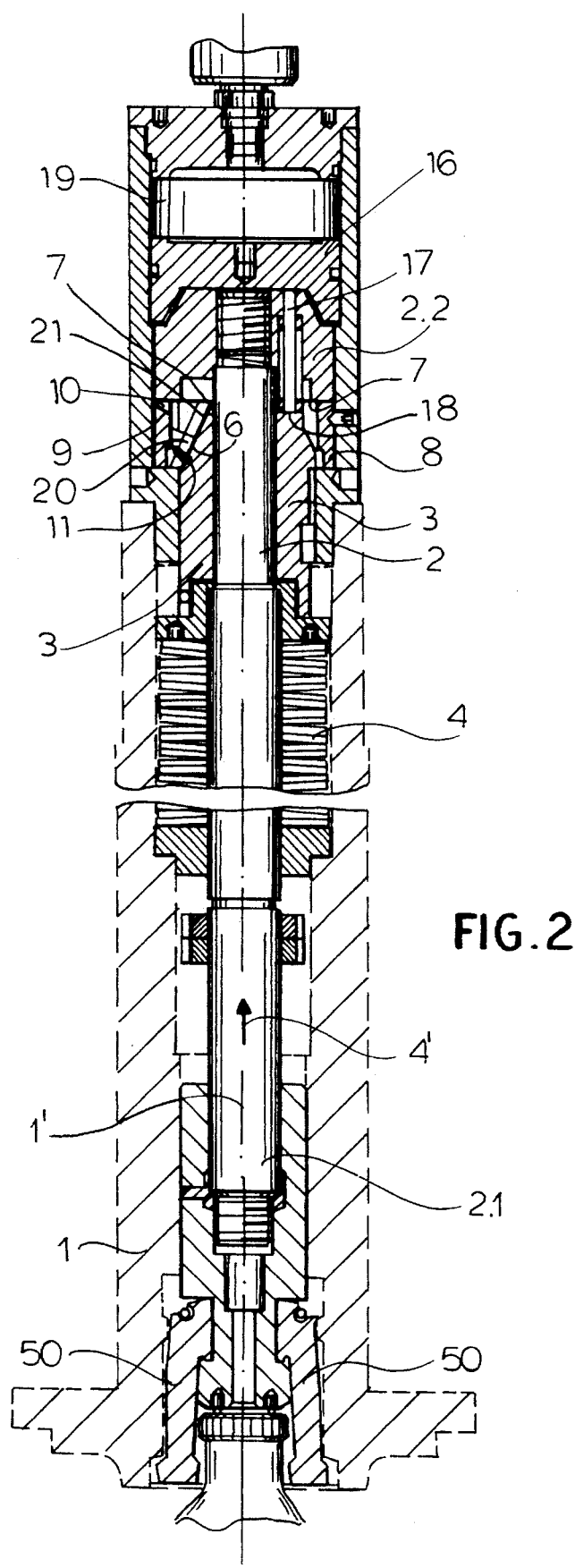

As seen in FIGS. 1 and 2 a tubular working spindle 1 centered on an axis 1' coaxially receives a pulling element or assembly 2 formed by a rod 2.1 whose rear end is screwed into a head-forming washer 2.2 and whose front end is coupled to pivotal jaws 50 of standard construction. A spring 4 formed by a stack of belleville washers surrounds the rod 2.1 and has a front end braced on a washer 12 in the spindle 1 and a rear end bearing via another washer 13 on a tubular or sleeve-like actuating body 3 so as to urge the body 3 axially backward as indicated by arrow 4'. Three angularly equispaced wedges 5 are arranged between a rearwardly inclined face 6 of the body 3, a forwardly directed perpendicular face 7 of the head 2.2, and a forwardly inwardly inclined face 9 of a support sleeve 8 fixed by screws 14 in the spindle 1.

Figure 3:
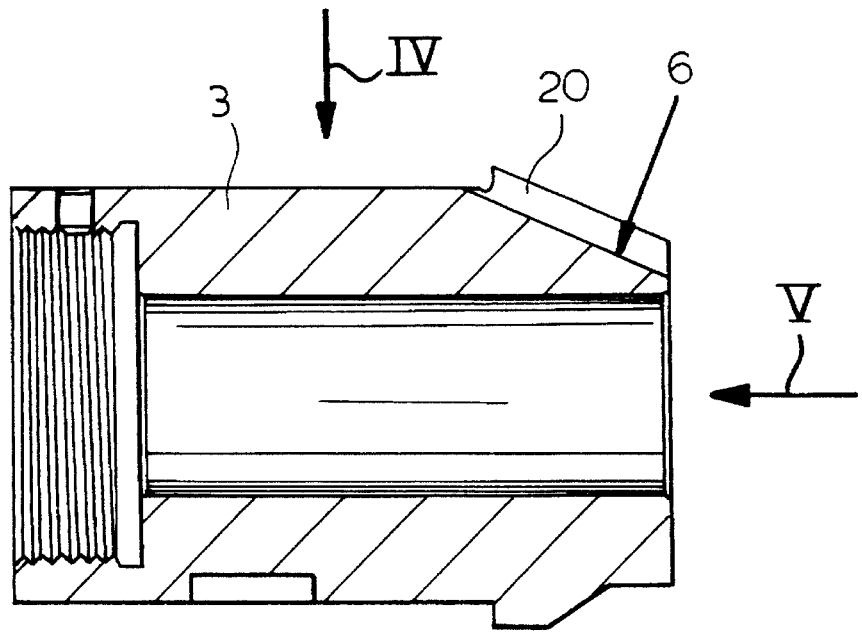
FIG. 3 is a large-scale axial section through the actuating body of this invention.
Figure 4:
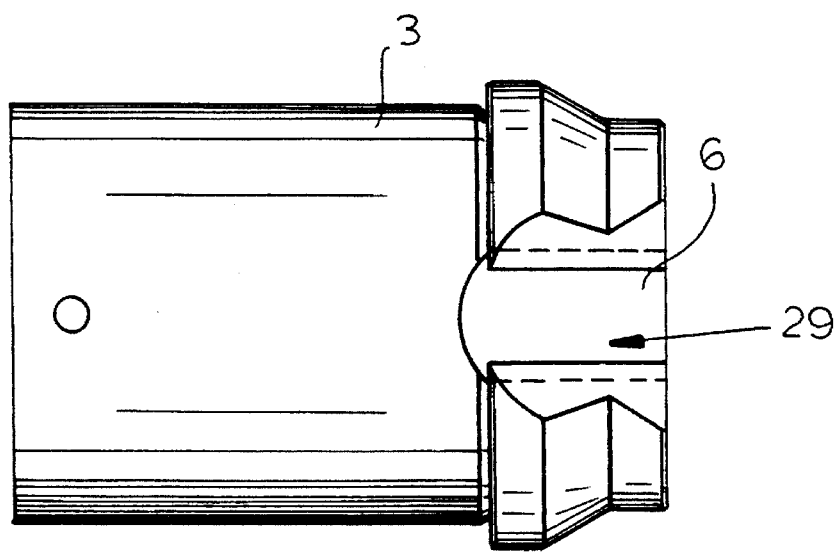
FIG. 4 is a side view of the body of FIG. 3 taken in the direction of arrow IV of FIG. 3.
Figure 5:
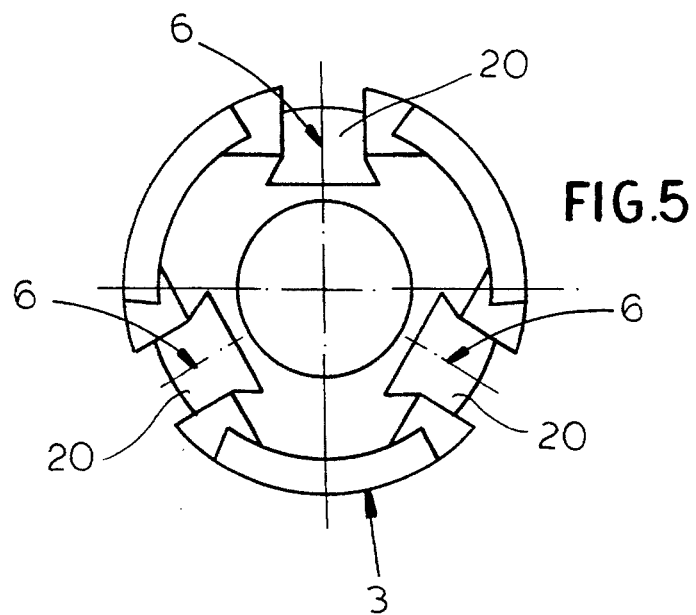
FIG. 5 is an end view of the body of FIG. 3 taken in the direction of arrow V of FIG. 3.

As better seen in FIGS. 3 through 5, the body 3, which is fixed by screws 15 on the washer 13, is actually formed with three notches 29 whose floors form the surface 6 which is inclined at an angle of 23° to the axis 4'. In addition each of these notch floors is formed with a dovetail-section guide slot 20 in which fits a dovetail-section ridge 21 (see FIGS. 8 and 9) of the respective wedge 5. The holder sleeve 3 is formed with three angularly equispaced notches 22 whose floors form the surfaces 9 that extend at an angle of 68° to the axis 4' and whose sides 23 lie in planes parallel to the axis 4' to ride on the flat sides 24 of the respective wedges 5.

Figure 8:
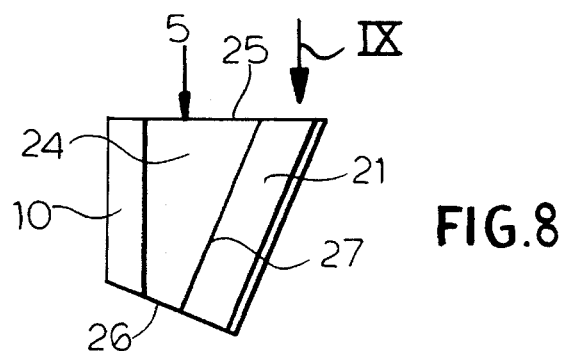
FIG. 8 is a large-scale side view of one of the wedges.
Figure 9:
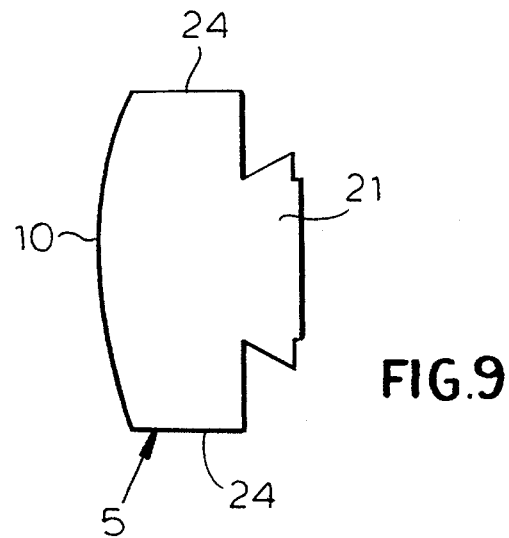
FIG. 9 is an end view taken in the direction of arrow IX of FIG. 8.
Figure 6:
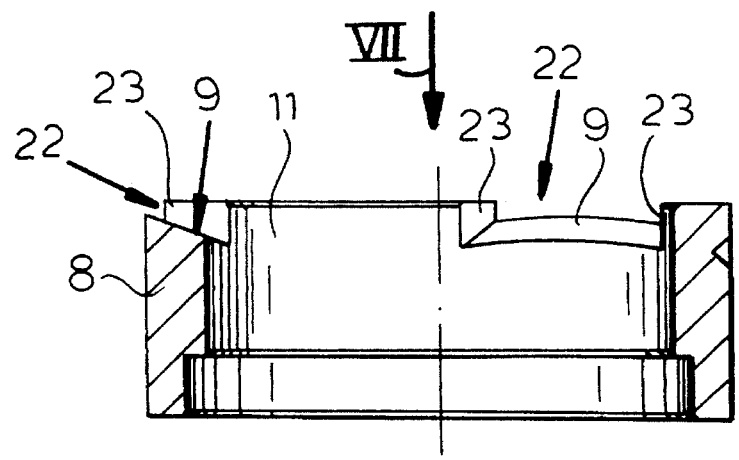
FIG. 6 is a large-scale axial section through the support sleeve.
Figure 7:
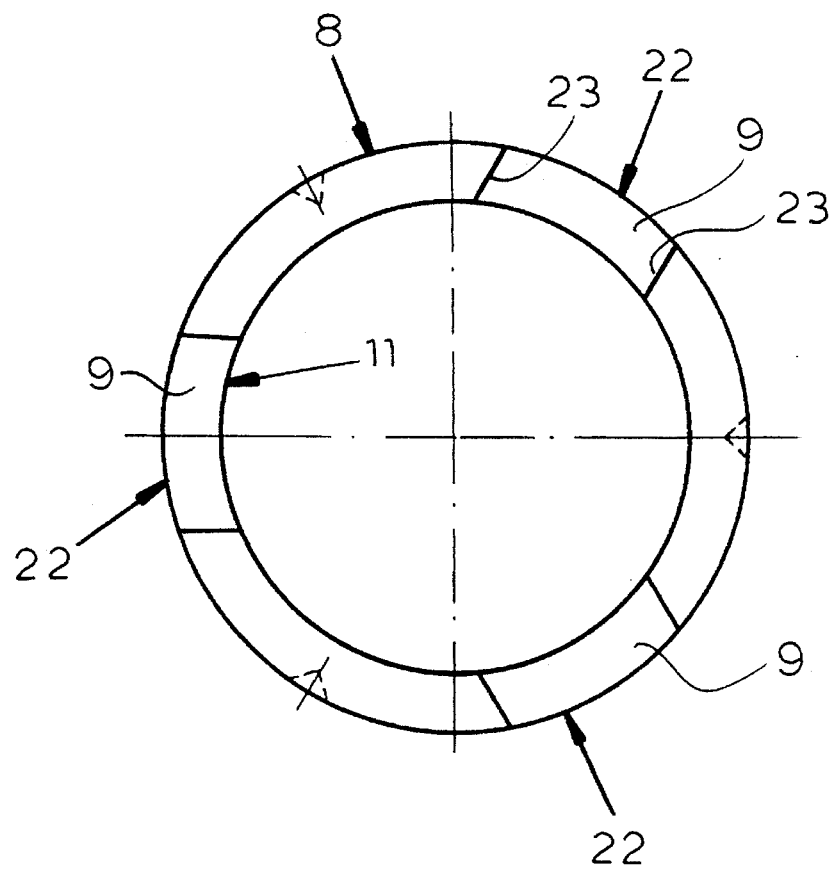
FIG. 7 is an end view taken in the direction of arrow VII of FIG. 6.

Furthermore each wedge 5 has as seen in FIGS. 8 and 9 a back face 25 that normally flatly abuts the surface 7, a front face 26 that can slide on the respective face 9, an inner face 27 that slides on the surface 6, and an outer face 10 that is of the same radius of curvature as a cylindrical inner surface 11 of the sleeve 8.

A release piston 16 is axially displaceable in the rear end of the tubular spindle 1 and forms a pressurizable chamber 19 therein. A source of hydraulic fluid illustrated schematically at 30 can pressurize this chamber 19. In addition three angularly equispaced rods 17 axially slidable in the head 2.2 have rear ends bearing on a front face of the piston 16 and front ends engageable with a rear face 18 of the body 3. The piston 16 is normally axially spaced behind the head 22 so that pressurization of the chamber 19 forces the piston 16 axially forward, first pushing the rods 17 against the body 3 to shift it forward, then abutting the piston 16 on the head 2.2 to force the entire assembly 2 forward.

The structure described above can move through two end positions shown respectively in FIGS. 1 and 2. In the FIG. 1 position corresponding to a locked or holding position of the device the spring 4 pushes the head 2.2 back to pull the jaws 50 back and hold a tool or workpiece 31 tightly on the spindle 1. The body 3 is therefore pushed back so that the wedges sit with their rear faces 25 flatly abutting the perpendicular front face of the head 2.2, their inner faces 27 flatly on the faces 6, and their front faces 26 flatly abutting the faces 9. The outer faces 10 are radially outside an axial extension of the surface 11. Thus these wedges 5 are solidly wedged between the head 2.2 and the sleeve 8 which as mentioned above is fixed in the spindle 1.

A forward traction on the jaws 50 will urge the assembly 2 forward, opposite to the direction 4'. Even if this force exceeds the backwardly effective force of the spring 4, the assembly 2 will be locked in place since force will be transmitted from the head 2.2 via the wedges 5 directly to the spindle 1. Admittedly there will be some radial inward component of force effective on the wedges 5 due to the inclination of the surfaces 9 and 26, but the angle is so small here that in effect this is a self-locking system that will not shift.

To release or unlock the holder the source 30 pressurizes the chamber 19. First of all this pressurization moves the piston 16 forward into contact with the head 2.2 while simultaneously pushing the body 3 axially forward via the rods 17. The result is that by the time the piston 16 actually contacts the rear face of the head 2.2 the inner surfaces 27 of the wedges 5 are wholly out of contact with the surfaces 6. Thus when the piston 16 engages the head 2.2 and starts to move it forward, the wedges 5 will be cammed inward by the angled surfaces 9 and 26, until as shown in FIG. 2 the outer surfaces 10 of the wedges 5 are inward of the inner surface 11 of the sleeve 8. Once this position is reached forward movement of the assembly 2 is possible with simultaneous forward movement of the wedges 5 within the sleeve 8, permitting the system to unlock or release. Clearly there is sufficient radial space between the rear portion of the face 7 and the inner face 11 of the sleeve 10 to accommodate the wedges 5, but not enough space at the front portion of the face 7.

I claim:

1. A holder for a tool or workpiece to be rotated about an axis, the holder comprising:

a tubular working spindle centered on and rotatable about the axis;

an elongated pulling element axially displaceable in the spindle and having a front end provided with at least one holder jaw and a rear end with a forwardly directed face substantially perpendicular to the axis;

an actuating body axially displaceable on the pulling element in the spindle forward of the element face and having an outwardly directed and rearwardly inwardly inclined face;

spring means braced between the spindle and the body for urging the body continuously backward toward the element face;

at least one wedge in the spindle between the body and the element face and having a rear end face flatly abuttable with the element face, an inclined inner face flatly abuttable with the body face, and a forwardly outwardly inclined front end face, the wedge being movable between an outer position with its end faces respectively flatly abutting the element and body faces and an inner position with its rear end face flatly abutting the element face and its front end face inward of and out of contact with the body face;

a support sleeve fixed in the spindle forward of the element face and having a rearwardly directed and rearwardly outwardly inclined face flatly abuttable with the front face of the wedge; and means for pushing the body axially forward relative to the element and thereby moving the wedge into its inner position and for thereafter pushing the element forward with the wedge moving axially forward within the support sleeve.

2. The holder defined in claim 1 wherein the body face and the inner wedge face are formed with an interfitting groove/ridge formation.

3. The holder defined in claim 2 wherein the formation is of dovetail section.

4. The holder defined in claim 1 wherein the support sleeve is formed with a rearwardly open notch having a floor forming the respective rear face and a pair of sides extending parallel to the axis and engaging complementary sides of the wedge.

5. The holder defined in claim 1 wherein the body face forms with the sleeve face a very small acute angle, whereby the wedges are self-locking.

6. The holder defined in claim 1 wherein there are a plurality of such wedges angularly equispaced about the axis, the body being tubular and slidable on the element.

7. The holder defined in claim 6 wherein the element is formed by a rod extending forward along the axis and having a front end carrying the jaw and a rear end, and a disk fixed to the rear end of the rod and forming the element face.

8. The holder defined in claim 7, further comprising:

a piston in the spindle axially behind the disk and forming with the spindle a pressurizable chamber;

at least one axially extending rod axially slidable in the disk and having a front end engageable with the body and a rear end engageable with the piston; and means for pressurizing the chamber and thereby pushing the rod axially forward and thereby also pushing the body axially forward so the wedges can move into the inner positions.

* * * * *